(12) United States Patent
Renes et al.

(10) Patent No.: US 11,206,136 B1
(45) Date of Patent: *Dec. 21, 2021

(54) METHOD FOR MULTIPLYING POLYNOMIALS FOR A CRYPTOGRAPHIC OPERATION

(71) Applicant: NXP B.V., Eindhoven (NL)

(72) Inventors: Joost Roland Renes, Eindhoven (NL); Joppe Willem Bos, Wijgmaal (BE); Tobias Schneider, Graz (AT); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,136

(22) Filed: May 27, 2020

(51) Int. Cl.
*H04L 9/30* (2006.01)
*G06F 7/53* (2006.01)

(52) U.S. Cl.
CPC .......... *H04L 9/3093* (2013.01); *G06F 7/5324* (2013.01)

(58) Field of Classification Search
CPC .. H04K 1/00; H04L 29/06; H04L 9/28; H04L 9/3093; H04L 9/3026; H04L 9/0816;
(Continued)

(56) References Cited

U.S. PATENT DOCUMENTS 5,341,385 A * 8/1994 Shirota ............... H03M 13/033
714/784
7,225,212 B2 * 5/2007 Stribaek ................ G06F 7/5443
708/209
(Continued)

FOREIGN PATENT DOCUMENTS

CN   110519058 A   11/2019
KR   101952547 B1   2/2019

OTHER PUBLICATIONS

Albrecht, Martin R. et al. "Implementing RLWE-based Schemes Using an RSA Co-Processor;" IACR Transactions on Cryptographic Hardware and Embedded Systems, vol. 2019, No. 1, 2019.
(Continued)

*Primary Examiner* — Thanhnga B Truong
(74) *Attorney, Agent, or Firm* — Daniel D. Hill

(57) ABSTRACT

A method is provided for multiplying two polynomials. In the method, first and second polynomials are evaluated at 2t inputs, where t is greater than or equal to one, and where each input is a fixed power of two $2^{i/(2t)}$ multiplied with a different power of a primitive root of unity, thereby creating 2 times 2t integers, where l is an integer such that $2^l$ is at least as large as the largest coefficient of the resulting product multiplying the first and second polynomials. The 2 times 2t integers are then multiplied pairwise, and a modular reduction is performed to get 2t integers. A linear combination of the 2t integers multiplied with primitive roots of unity is computed to get 2t integers whose limbs in the base $2^l$-bit representation correspond to coefficients of the product of the first and second polynomials. The method can be implemented on a processor designed for performing RSA and/or ECC type cryptographic operations.

18 Claims, 2 Drawing Sheets

(58) Field of Classification Search
CPC ...... H04L 9/008; H04L 9/3066; H03M 13/03; H03M 13/00; H03M 13/15; G06F 7/724; G06F 17/10; G06F 7/00; G06F 7/72; G06F 7/5324; G06F 5/01
See application file for complete search history.

(56) References Cited

U.S. PATENT DOCUMENTS

| | | | | |
|---|---|---|---|---|
| 7,840,623 | B2 | 11/2010 | Tonomura et al. | |
| 8,019,079 | B2 | 9/2011 | Delgosha et al. | |
| 8,477,935 | B2* | 7/2013 | Langendoerfer | H04L 9/3066 380/30 |
| 8,958,555 | B2* | 2/2015 | Gentry | H04L 9/3026 380/44 |
| 2006/0072743 | A1* | 4/2006 | Naslund | H04L 9/3066 380/28 |
| 2008/0114820 | A1* | 5/2008 | Amin | G06F 7/722 708/209 |

OTHER PUBLICATIONS

Fateman, Richard J.; "Can You Save Time in Multiplying Polynomials by Encoding Them as Integers?;" University of California, Berkeley, California; Original Article Oct. 2003; Revised Aug. 21, 2010.

Harvey, David; "Faster Polynomial Multiplication via Multipoint Kronecker Substitution;" Journal of Symbolic Computation 44; Oct. 2009; https://doi.org/10.1016/j.jsc.2009.05.004.

Kronecker, L. "Grundzuge Einer Arithmetischen Theorie der Algebraischen Grossen;" Sep. 10, 1881; Journal Fur Die Reine Und Angewandte Mathematik 92; 1882 [German Translation to English Unavailable].

Lyubashevsky, Vadim et al.; "On Ideal Lattices and Learning with Errors Over Rings;" EUROCRYPT 2010: 29th Annual International Conference on the Theory and Applications of Crypographic Techniques; May 30-Jun. 3, 2010; French Riviera; DOI: 10.1007/978-3-642-13190-5_1.

Regev, Oded; "On Lattices, Learning with Errors, Random Linear Codes, and Cryptography;" Journal of the ACM 56 (6), Article 34; May 2, 2009.

Schonhage, Arnold; "Schnelle Multiplikation von Polynomen Uber Korpern der Charakteristik 2;" Acta Informatica 7 (1977); https://doi.org/10.1007/BF00289470 [German Translation to English Unavailable].

Schonhage, Arnold; "Asymptotically Fast Algorithms for the Numerical Multiplication and Division of Polynomials with Complex Coefficients;" Computer Algebra: EUROCAM 1982, European Computer Algebra Conference; Apr. 5-7, 1982, Marseille, France.

\* cited by examiner

METHOD FOR MULTIPLYING POLYNOMIALS FOR A CRYPTOGRAPHIC OPERATION

Background

FIELD

This disclosure relates generally to cryptography and more specifically to a method of multiplying polynomials in a processor to perform a cryptographic operation.

RELATED ART

The development of quantum computers threatens the security of certain currently widely used public key cryptography algorithms such as the RSA (Rivest-Shamir-Adleman) algorithm. Most recently, advances in quantum computing have accelerated the research into "post-quantum cryptography" schemes, that is, new cryptography schemes that are believed to be secure even when faced with an attacker using a quantum computer. There are various families of problems that are being considered to instantiate these post-quantum cryptographic approaches. One approach is based on the hardness of certain lattice problems. That is, solving these difficult lattice problems compromises the cryptography. When implemented, computationally expensive operations of some proposed lattice-based post-quantum cryptography schemes include arithmetic with polynomials with integer coefficients. Some currently used public-key cryptography algorithms require arithmetic of large integers, where the integers may include hundreds or thousands of bits. In contrast, the coefficients used for polynomial multiplication for lattice-based algorithms may be much smaller, e.g., 32 bits or less. Typically, special purpose processors are implemented in a data processing system to offload the computationally difficult problems from the main processor of the system. However, the special purpose co-processors currently used to implement existing RSA or Elliptic-curve cryptography (ECC) algorithms cannot efficiently and quickly perform the polynomial multiplications required for lattice-based cryptography. Developing new special-purpose co-processors to perform the computations needed by lattice-based post-quantum cryptography efficiently and quickly is expensive and time consuming.

Therefore, a need exists for a method to multiply two polynomials for a cryptographic application efficiently using existing co-processors.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
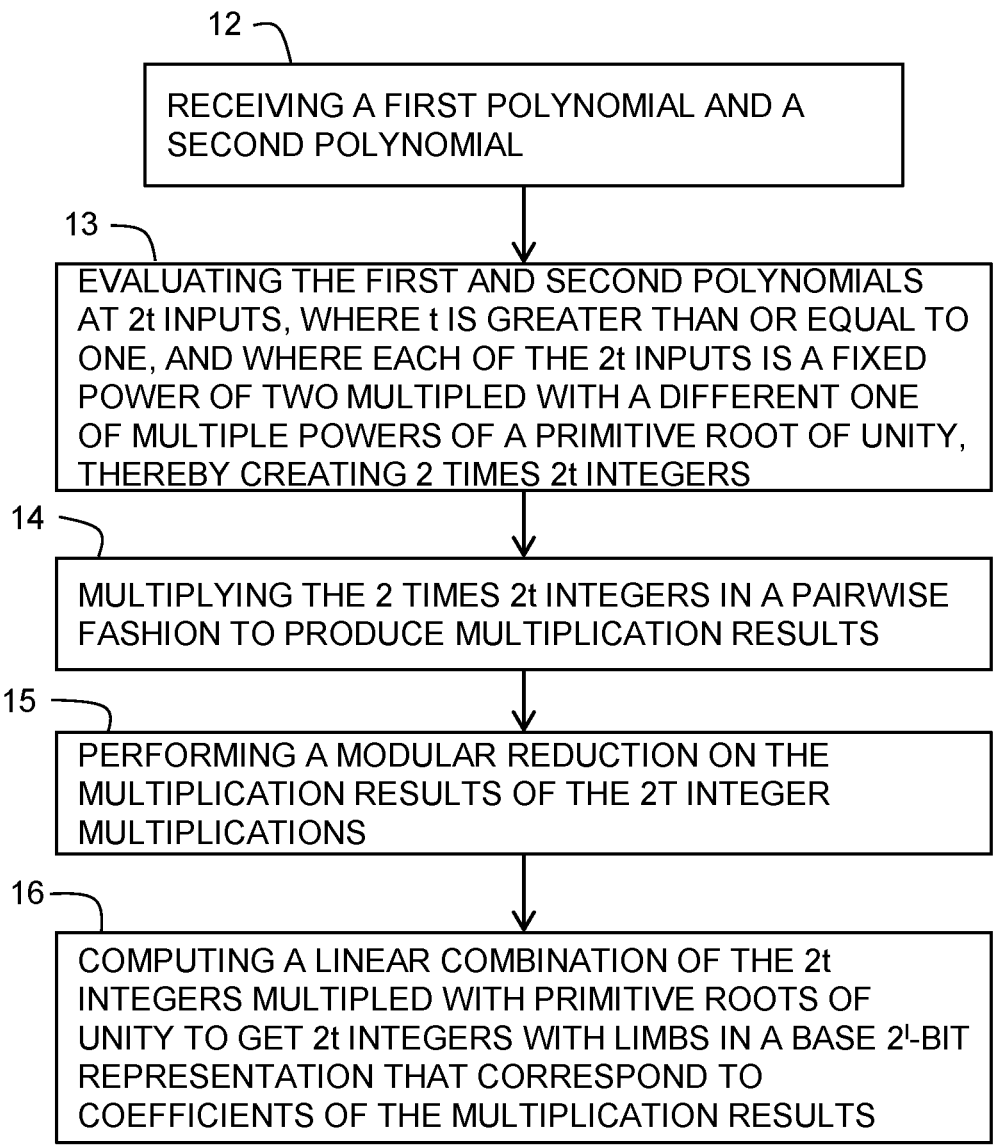
FIG. 1 illustrates a flow chart of a method for multiplying two or more polynomials in accordance with an embodiment.

Lattice-based cryptography supports various commonly used cryptographic functionality such as exchanging secret keys, digital signatures, encryption, and decryption. In addition, lattice-based cryptography supports other cryptographic functionality such as homomorphic encryption, and the like. Lattice-based cryptography has many practical applications such as establishing secure connections over a network (e.g., the internet), guaranteeing the integrity of software (e.g., when updating or booting a device) and performing cryptographic operations on encrypted data in the cloud. When implemented in either hardware or software, many lattice-based constructions work on polynomials that are generated from random user input or publicly known seeds to enhance performance and reduce memory requirements. For example, in various lattice-based cryptographic schemes, such as for example, an asymmetric cryptography scheme using a pair of keys, a user's private key of the key pair includes a vector of polynomials having coefficients that are sampled randomly. A public key of the key pair is a matrix of polynomials having coefficients that are either public or generated from a public seed. The longest arithmetic operations carried out by these implementations are multiplications involving two polynomials, and the operations may be repeated several times. The polynomials typically have a fixed, or finite, number of coefficients, while the coefficients themselves lie in a modular ring, such as the integers modulo prime or a power of two. These are properties of the particular cryptographic scheme and are fixed by parameters of the scheme.

Generally, there is provided, a method for multiplying two or more polynomials to accomplish a cryptographic operation. The method may be performed in a co-processor of a data processing system. In the method, a first polynomial and a second polynomial are received in a processor for executing a cryptographic algorithm, such as for example, a lattice-based cryptography algorithm. The first and second polynomials are evaluated at 2t inputs, where t is greater than or equal to one, and where each input is a fixed power of two multiplied with a different power of a primitive root of unity, thereby creating 2 times 2t integers. The power of two is determined to be at least as large as the largest coefficient of the resulting product of the multiplying of the first and second polynomial. The 2 times 2t integers are then multiplied pairwise, after which a modular reduction is performed to get 2t integers. Finally, a linear combination of the 2t integers multiplied with primitive roots of unity is computed, to get 2t integers whose limbs in the base $2^l$-bit representation correspond to the coefficients of the product of the first and second polynomial, where l is an integer chosen large enough such that the coefficients of the product of the first and second polynomial are smaller than $2^l$.

In accordance with an embodiment, there is provided, a method for multiplying two or more polynomials to perform a cryptographic operation in a data processing system, the method for use in a processor of the data processing system, the method including: receiving a first polynomial and a second polynomial by the processor; evaluating the first polynomial and the second polynomial at 2t inputs, where t is greater than or equal to one, and where each of the 2t inputs is a fixed power of two multiplied with a different one of multiple powers of a primitive root of unity, thereby creating 2 times 2t integers; multiplying the 2 times 2t integers in a pairwise fashion to produce multiplication results; performing a modular reduction on the multiplication results of the 2t integer multiplications; and computing a linear combination of the 2t integers multiplied with primitive roots of unity to get 2t integers with limbs in a base $2^l$-bit representation, where l is an integer, that correspond to coefficients of the multiplication results. In the method, t and the multiple powers of the primitive root of unity may be precomputed. The fixed power of two may be determined to be at least large enough so that the fixed power of two is larger than every coefficient of the product of the first and second polynomials. The method may be performed in a ring of a form $R_q=(\mathbb{Z}/q\mathbb{Z})[X]/(X^n+1)$ where coefficients of the polynomial are in $\mathbb{Z}/q\mathbb{Z}$ and the method is performed in modulo $X^n+1$. Receiving the first and second polynomials may further include storing the first and second polynomials in a processor of a data processing system. The cryptographic operation may be a lattice-based cryptographic operation.

In another embodiment, there is provided, a method for multiplying two or more polynomials to perform a cryptographic operation in a data processing system, the method for use in a processor of the data processing system, the method including: receiving a first polynomial and a second polynomial in the processor; evaluating the first polynomial and the second polynomial at 2t inputs in the processor, where t is greater than or equal to one, and where each of the 2t inputs is a fixed power of two multiplied with a different one of multiple powers of a primitive root of unity $\zeta$, where $\zeta^t = -1 \mod(2^{2l_2 n}-1)$, where $l \in \mathbb{Z}$ and where $\mathbb{Z}$ is a ring of integers, and where l is an integer, thereby creating 2 times 2t integers; multiplying the 2 times 2t integers in a pairwise fashion to produce multiplication results in the processor; performing a modular reduction on the multiplication results of the 2t integer multiplications; and computing a linear combination of the 2t integers multiplied with primitive roots of unity to get 2t integers with limbs in a base $2^l$-bit representation that correspond to coefficients of the multiplication results. In the method, t and the roots of unity may be precomputed. The fixed power of two may be determined to be at least large enough so that the fixed power of two is larger than every coefficient of the product of the first and second polynomials. The method may be performed in a ring of a form $R_q=(\mathbb{Z}/q\mathbb{Z})[X]/(X^n+1)$ where coefficients of the polynomial are in $\mathbb{Z}/q\mathbb{Z}$ and the method is performed in modulo $X^n+1$. Receiving the first and second polynomials may further include storing the first and second polynomials in a processor of a data processing system. The cryptographic operation may be a lattice-based cryptographic operation.

In yet another embodiment, there is provided, a data processing system including instructions embodied in a non-transitory computer readable medium, the instructions for multiplying two or more polynomials in a cryptographic operation in a processor, the instructions including: instructions for receiving a first polynomial and a second polynomial; instructions for evaluating the first polynomial and the second polynomial at 2t inputs, where t is greater than or equal to one, and where each of the 2t inputs is a fixed power of two multiplied with a different one of multiples powers of a primitive root of unity, thereby creating 2 times 2t integers; instructions for multiplying the 2 times 2t integers in a pairwise fashion to produce multiplication results; instructions for performing a modular reduction on the multiplication results of the 2t integer multiplications; and instructions for computing a linear combination of the 2t integers multiplied with primitive roots of unity to get 2t integers with limbs in a base $2^l$-bit representation that correspond to coefficients of the multiplication results. In the data processing system, t and the multiple powers of the primitive root of unity may be precomputed. The fixed power of two may be determined to be at least large enough so that the fixed power of two is larger than every coefficient of the product of the first and second polynomials. The method may be performed in a ring of a form $R_q=(\mathbb{Z}/q\mathbb{Z})[X]/(X^n+1)$ where coefficients of the polynomial are in $\mathbb{Z}/q\mathbb{Z}$ and the method is performed in modulo $X^n+1$. Receiving the first and second polynomials may further include storing the first and second polynomials in a processor of a data processing system. The cryptographic operation is a lattice-based cryptographic operation.

A method to reduce computational problems related to multivariate polynomials to univariate polynomials was proposed by a mathematician named L. Kronecker as set out in "Grundzüge einer arithmetischen theorie der algebraischen grössen, Journal für die reine und angewandte" Mathematik 92 (1882), 1-122. A hundred years later, a similar technique was introduced by Arnold Schönhage in *"Schnelle multiplikation von polynomen über körpern der charakteristik 2"*, Acta Informatica 7 (1977), 395-398 to reduce polynomial multiplications in $\mathbb{Z}[X]$ to integer multiplication (multiplications in $\mathbb{Z}$) ("Asymptotically fast algorithms for the numerical multiplication and division of polynomials with complex coefficients," by Arnold Schönhage, Computer Algebra (Jacques Calmet, ed.), Springer Berlin Heidelberg, 1982, pp. 3-15) incorporated herein by reference. This approach is known as the Kronecker substitution method. In the approach, given two polynomials $f,g \in \mathbb{Z}[X]$ of degree (up to) $n-1 \in \mathbb{Z}$, the goal is to compute the polynomial multiplication $h=f \cdot g$. Kronecker's idea is to evaluate the polynomials at a sufficiently high power of two (e.g., $f(2^l)$ and $g(2^l)$) and use the resulting integers as input for a regular integer multiplication by computing $h(2^l)=f(2^l) \cdot g(2^l)$. Finally, the resulting integer $h(2^l)$ is converted back to its polynomial representation $h \in \mathbb{Z}[X]$. The result is correct if the coefficients of the resulting polynomial did not "mix" with each other, i.e. if the parameter $l \in \mathbb{Z}$ is sufficiently large. An advantage of this approach, computing a polynomial multiplication with an integer multiplication, is that well-studied and fast implementations of asymptotic integer multiplication methods can be used.

The size of the integers multiplied in the Kronecker procedure is strongly related to the size of l. Simply put, the larger l, the larger the integers, and the variable l needs to be above a certain threshold in order to avoid "mixing" of the polynomial coefficients and rendering the result incorrect. A mathematician named David Harvey observed in an article entitled "Faster Polynomial Multiplication Via Multipoint Kronecker Substitution" in the Journal of Symbolic Computation 44 (2009), no. 10, 1502-1510, incorporated herein by reference, that the size of l can be reduced by splitting up the polynomial evaluation into two parts. Assuming for simplicity that l is even, and given $f,g \in \mathbb{Z}[X]$, David Harvey computes $$h(2^{l_2})=f(2^{l_2}) \cdot g(2^{l_2}),$$

$$h(-2^{l_2})=f(-2^{l_2}) \cdot g(-2^{l_2}),$$

where $l_2=l/2$. David Harvey then observes that $$h^{(0)}(2^l)=(h(2^{l_2})+h(-2^{l_2}))/2,$$

$$h^{(1)}(2^l)=(h(2^{l_2})-h(-2^{l_2}))/2 \cdot 2^{l_2},$$

where $h^{(i)}$ denotes the polynomial whose $j^{th}$ coefficient equals the $(2j+1i)^{th}$ coefficient of h. In other words, $$h^{(0)}(2^l) = \sum_{j=0}^{n/2-1} h_{2j} 2^{jl}, \text{ and } h^{(1)}(2^l) = \sum_{j=0}^{n/2-1} h_{2j+1} 2^{jl}.$$

The coefficients of h can therefore be recovered as the l-bit limbs $h^{(0)}(2^l)$ and $h^{(1)}(2^l)$. Denoting by M(b) the cost of multiplying two b-bit integers, this approach changes the cost of the polynomial multiplication in $\mathbb{Z}[X]$ from M(l·n)+ O(l·n) in the case of standard Kronecker, to 2·M(l·n/2)+O (l·n). Here the O terms represent overhead and the cost of packing and unpacking. This has significant advantages whenever the cost of multiplying is more expensive than linear in n. Harvey also considers a second approach to split up the evaluation into four parts by also evaluating at the reciprocal $f(2^{-l/4})$, which gives rise to multiplication with a cost of 4·M(l·n/4)+O(l·n).

Arnold Schönhage provided another algorithm for multiplying polynomials, commonly referred to as the Schönhage-Strassen multiplication, in an article entitled "Schnelle Multiplikation von Polynomen über Körpern der Charakteristik 2, Acta Informatica 7 (1977), 395-398. Given two integers a, b∈$\mathbb{Z}$, the idea behind the Schönhage-Strassen algorithm is to embed $\mathbb{Z} \subseteq \mathbb{Z}/(2^N+1)$ for some integer N that is a power of 2 and such that $a \cdot b \leq 2^N+1$. Then $a \cdot b \mod(2^N+1)$ is computed and the result in $\mathbb{Z}$ is provided by taking the unique representative in the interval [0, ..., $2^N-1$]. The main advantage of N being a power of 2 is that it contains many roots of unity. For example, 2 itself is a primitive $2^N$-th root of unity for N≥1. As a result, standard techniques such as the Fast Fourier Transform (FFT), which employs the roots of unity, can be applied in the ring to decompose a single (large) multiplication into many (small) multiplications using a convolution theorem. Note that the ring of integers $\mathbb{Z}$ only has 2 roots of unity. By embedding into $\mathbb{Z}/(2^N+1)$, for some chosen N, access to roots of unity is gained.

Recent advances in quantum computing have accelerated the research into post-quantum cryptography schemes, that is, cryptographic algorithms which run on currently available computers but are believed to be still secure even when faced against an adversary with access to a quantum computer. When implemented, the main computationally expensive operation is arithmetic with polynomials with integer coefficients. More precisely, computations are done in a ring $R_q=(\mathbb{Z}/q\mathbb{Z})[X]/(X^n+1)$ where the coefficients of the polynomials are in $\mathbb{Z}/q\mathbb{Z}$ while the polynomial arithmetic is modulo $X^n+1$. In contrast to other popular classical public-key cryptography algorithms where arithmetic of large integers is needed (where the large integers may include hundreds or thousands of bits) the value of q is much smaller, for example, less than or equal to 32 bits. This makes the hardware accelerators, or co-processors, developed and deployed for currently used public-key cryptography obsolete since they cannot be used efficiently for polynomial multiplication with small coefficients.

In the disclosed embodiment, Kronecker substitution (including the signed variant and the multi-point evaluation) is used to compute arithmetic in $R_q$ using the existing co-processors. In post-quantum cryptography, the main arithmetic operations include polynomial multiplication in the ring $(\mathbb{Z}/q\mathbb{Z})[X]/(X^n+1)$ where typically $q<2^{32}$ and n∈{256, 1024}. This makes it hard to directly apply the existing fast and hardened arithmetic co-processors designed for known public-key cryptography such as ECC and RSA. The described embodiment applies number theoretic transform (NTT) techniques and roots of unity to the Kronecker setting which results in a significantly faster solution on processors designed for RSA and ECC calculations.

In one embodiment, let f, g∈$\mathbb{Z}[X]$ be two polynomials of degree at most n−1, such that the goal is to compute h=f·g. As deg(f·g)≤2n, this is equivalent to computing h≡f·g mod ($X^{2n}-1$) and taking its unique representative of degree strictly less than 2n. Now choose some t such that 2t|l and let $l_{2t}=l/(2t)$, such that $\zeta=2^{l_{2t}n/t}$ is a primitive $2t^{th}$ root of unity modulo ($2^{2l_{2t}n}-1$). This results in the following 2t pairwise multiplications $$h(\zeta^i \cdot 2^{l_{2t}})=f(\zeta^i \cdot 2^{l_{2t}})g(\zeta^i \cdot 2^{l_{2t}}) \mod(2^{2l_{2t}n}-1), 0 \leq i \leq 2t-1. \quad (1)$$

Note that $\zeta^i \neq 1$ as $\zeta$ is a primitive root of unity, thus $\zeta^i \equiv 1 \mod(2^{2l_{2t}n}-1)$. Note that because $\zeta$ is a power of two, so are powers of $\zeta$. This has the practical advantage that multiplication by powers of $\zeta$ can be implemented by simple bit-shifts. It follows that $$h^{(i)}(2^l) \equiv \frac{\sum_{j=0}^{2t-1} \zeta^{i(2t-j)} h(\zeta^j \cdot 2^{l_{2t}})}{2^{il_{2t}} \cdot 2t} \mod(2^{2l_{2t}n}-1).$$

To recover h, note that $$h^{(i)}(2^l) = \sum_{j=0}^{n/2t-1} h_{2tj+i} 2^{jl},$$

so that the coefficients of h can be read off as l-bit limbs from the appropriate $h^{(i)}$. Each coefficient has a maximum precision of $2t \cdot l_{2t}=l$ bits. Additionally, Eqn. (1) performs 2t multiplications, each of length $2l_{2t}n$ bits. However, $f(2^{l_{2t}})$, $g(2^{l_{2t}})$, $f(\zeta^t 2^{l_{2t}})=f(-2^{l_{2t}})$ $g(\zeta^t 2^{l_{2t}})=g(-2^{l_{2t}})$ all fit into $l_{2t}n$ bits. Therefore, those multiplications only require a $l_{2t}n$-bit multiplier.

Denoting by M(b) the cost of multiplying two b-bit integers, the cost of the polynomial multiplication in $\mathbb{Z}[X]$ is generalized from 2M(l·n/2)+O(l·n) to 2M(l·n/(2t))+(2t−2) M(l·n/t)+O(l·n). The overhead relating to converting from and to polynomial representation is the O(l·n) term.

This technique can also be applied to polynomial multiplication in a ring $\mathbb{Z}[X]/I$, if there exist $2t^{th}$ roots of unity in $\mathbb{Z}[X]/I$. In this case, all multiplications can be performed modulo I as opposed to ($2^{2l_{2t}n}-1$).

In another embodiment, the case is considered where we are not interested in the polynomials f·g, but only in their product modulo $X^n+1$. The primitive root of unity $\zeta$ is also a primitive $2t^{th}$ root modulo $2^{l_{2t}n}+1$, and all intermediate products can be taken modulo $2^{l_{2t}n}+1$ as opposed to $2^{2l_{2t}n}-1$. This reduces the sizes of the integers that are being multiplied by half. For example, compute $$h(\zeta^i \cdot 2^{l_{2t}})=f(\zeta^i \cdot 2^{l_{2t}}) \cdot g(\zeta^i \cdot 2^{l_{2t}}) \mod(2^{l_{2t}n}+1), 0 \leq i \leq 2t-1,$$

and note that $$h^{(i)}(2^l) \equiv \frac{\sum_{j=0}^{2t-1} \zeta^{i(2t-j)} h(\zeta^j \cdot 2^{l_{2t}})}{2t} \mod(2^{l_{2t}n}+1).$$

To recover h, again observe that $$h^{(i)}(2^l) = \sum_{j=0}^{n/2t-1} h_{2tj+i} 2^{jl},$$

so that the coefficients of h can be read off as l-bit limbs from the appropriate $h^{(i)}$. In this case the operation count is easier, as we simply perform 2t multiplications of $l_2$,n bits each. The overhead relating to converting from and to polynomial representation is O(l·n). Note that in practice, the described method for multiplying polynomials may be combined with other computations such as adding a result of the multiplication to another polynomial without impacting the method.

As discussed above, the Kronecker substitution method performs polynomial multiplication by evaluating both polynomials at a carefully chosen input, typically a power of two $2^l$, where l is an integer chosen such that the biggest coefficient of the resulting product of the multiplying of the first and second polynomial is smaller than $2^l$. In this way, a multiplication of two polynomials can be reduced to an integer multiplication where each of the inputs consists of l·n bits, where n is the number of coefficients of both polynomials, with some additional overhead caused by converting from polynomials to integers, and back. The above described embodiment of the invention evaluates both polynomials at smaller powers of two, and furthermore multiplies the inputs by 2t distinct roots of unity. This reduces the polynomial multiplication to 2t integer multiplications, where each of the integers consists of l·n/(2t) bits. On a w-bit computer architecture, the basic Kronecker approach needs $(l·n/w)^2$ multiplication instructions. Using the described embodiment, the number of multiplication instructions can be reduced to $(l·n/w)^2/(2t)$. As can be seen, this results in a significant reduction in the number of multiplication instructions. The roots of unity are obtained through properties of the ring $(\mathbb{Z}/q\mathbb{Z})[X]/(X^n+1)$ where n is an integer, q is a prime integer, $\mathbb{Z}$ is the ring of integers, $\mathbb{Z}/q\mathbb{Z}$ is the ring of integers modulo q and $(\mathbb{Z}/q\mathbb{Z})[X]/(X^n+1)$ is the polynomial ring with variable X where coefficients are from $(\mathbb{Z}/q\mathbb{Z})$ and polynomials are reduced modulo $X^n+1$ as used in lattice-based cryptography.

FIG. 1 illustrates a flow chart of a method 10 for multiplying two or more polynomials in accordance with an embodiment. Method 10 starts at step 12. At step 12, a first polynomial and a second polynomial are received in a processor for executing a cryptographic algorithm, such as for example, a lattice-based cryptography algorithm. The first and second polynomials may be stored in a memory of the processor. At step 13, the first and second polynomials are evaluated at 2t inputs, where t is greater than or equal to one, and where each input is a fixed power of two multiplied with a different power of a primitive root of unity, thereby creating 2 times 2t integers. The power of two is determined to be at least large enough so that the coefficients of the resulting product of the multiplying of the first and second polynomials can be stored in l bits. Note that the values of t and the roots of unity may be precomputed. At step 14, the 2 times 2t integers are then multiplied pairwise to produce multiplication results, after which a modular reduction is performed to get 2t integers at step 15. Finally, at step 16, a linear combination of the 2t integers multiplied with primitive roots of unity is computed, to get 2t integers whose limbs in the base $2^l$-bit representation correspond to the coefficients of the product of the first and second polynomial.

Method 10 can be applied directly to the existing fast and hardened arithmetic co-processors designed for known public-key cryptography such as ECC and RSA. As described above, the method applies number theoretic transform (NTT) techniques and roots of unity to the Kronecker setting which results in a faster and more efficient solution on processors designed for RSA and ECC calculations.

Figure 2:
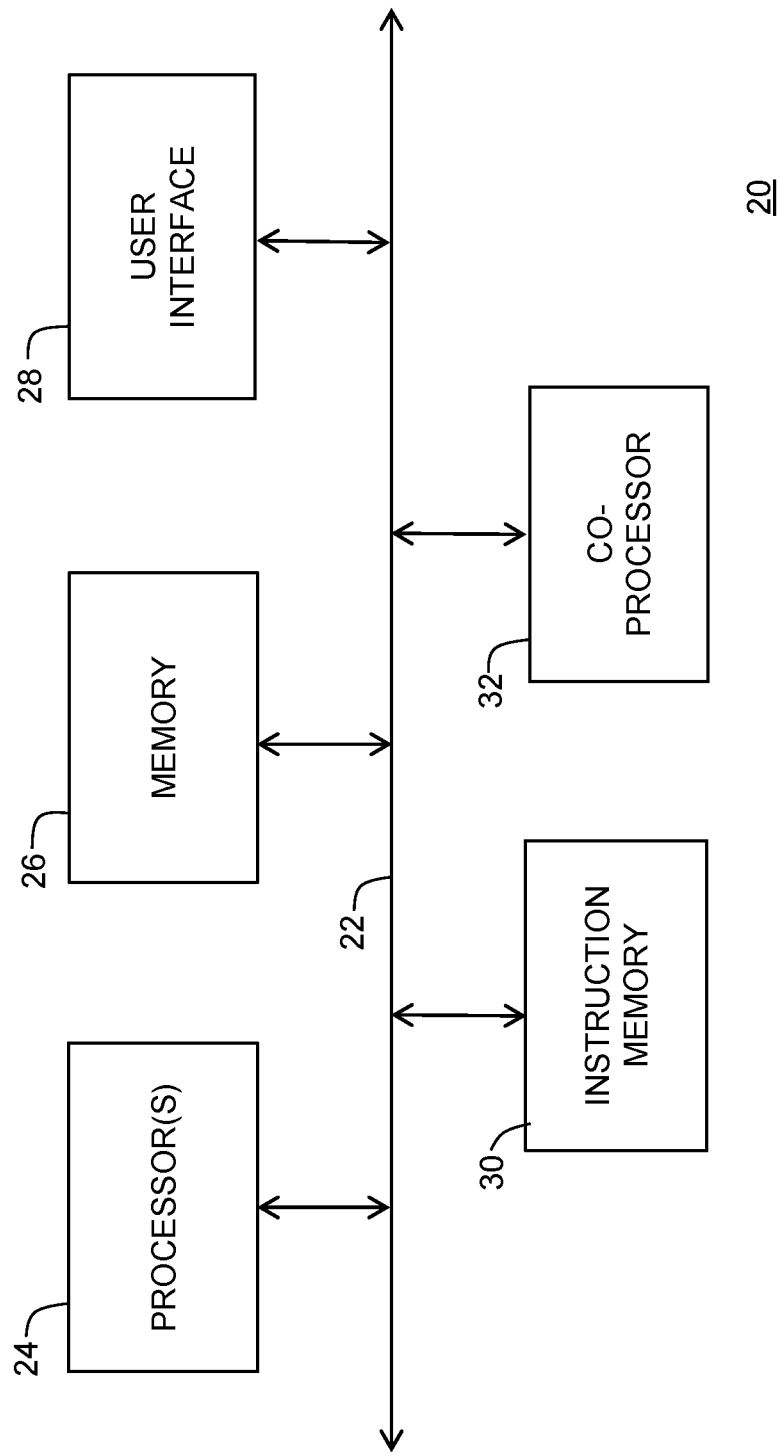
FIG. 2 illustrates, in block diagram form, a data processing system including a co-processor for multiplying two or more polynomials in accordance with an embodiment.

FIG. 2 illustrates, in block diagram form, data processing system 20 including a co-processor 32 for multiplying two or more polynomials in accordance with an embodiment. Data processing system 20 may be a system-on-a-chip (SoC) implemented on a single integrated circuit, or it may be a combination of chips. In other embodiments, integrated circuit 10 may include another type of circuit such as an ASIC (application specific integrated circuit), FPGA (field programmable gate array), or the like, that can provide execute instructions. In one embodiment, data processing system 20 may include metal-oxide semiconductor (MOS) transistors fabricated using a conventional complementary metal-oxide semiconductor (CMOS) process. In another embodiment, data processing system 20 may include other transistor types, such as bipolar, and may be manufactured with a different process.

Data processing system 20 includes communication bus 22, processor(s) 24, memory 26, and cryptography co-processor 32. Bus 22 may be a conventional bus having a plurality of conductors for communicating address, data, and control information. In other embodiments, bus 22 may be an interconnect structure such as for example, a cross-bar switch or other form of interconnect system. Processor(s) 24 is bi-directionally connected to bus 22. Processor(s) 24 may include one or more of any type of processing element, a processor core, microprocessor, microcontroller, field-programmable gate arrays (FPGAs), application-specific integrated circuits (ASICs), digital signal processor, and the like. There can be any number of processors.

Memory 26 is bi-directionally connected to bus 22. Memory 26 can be one or more of any type of volatile or non-volatile memory. Examples of memory types include non-volatile memories such as flash, one-time programmable (OTP), EEPROM (electrically eraseable programmable read only memory), and the like. Volatile memory types include static random-access memory (SRAM) and dynamic random-access memory (DRAM). The memory may be used for storing instructions and/or data.

User interface 28 is bi-directionally connected to bus 22 and may be connected to one or more devices for enabling communication with a user such as an administrator. For example, user interface 28 may be enabled for coupling to a display, a mouse, a keyboard, or other input/output device. User interface 28 may also include a network interface having one or more devices for enabling communication with other hardware devices external to data processing system 20.

Instruction memory 30 may include one or more machine-readable storage media for storing instructions for execution by processor(s) 24. In other embodiments, both memories 26 and 30 may store data upon which processor(s) 24 may operate. Memories 26 and 30 may also store, for example, encryption, decryption, and verification applications. Memories 26 and 30 may be implemented in a secure hardware element and may be tamper resistant.

Co-processor 32 is bi-directionally connected to bus 22. Co-processor 20 may be a special type of a co-processor optimized for running encryption/decryption security software according to the RSA, ECC, or Advanced Encryption Standard (AES) or other type of commonly used encryption algorithm. Accordingly, and in accordance with the described embodiments, co-processor 32 may be used to efficiently execute instructions for performing polynomial multiplications for post-quantum cryptography as discussed above and illustrated in the flowchart of FIG. 1. The algorithm executed on co-processor 32 may be used to encrypt/decrypt data and instructions in data processing system 20.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for multiplying two or more polynomials to perform a cryptographic operation in a data processing system, the method for use in a processor of the data processing system, the method comprising:
    receiving a first polynomial and a second polynomial by the processor;
    evaluating the first polynomial and the second polynomial at 2t inputs, where t is greater than or equal to one, and where each of the 2t inputs is a fixed power of two multiplied with a different one of multiple powers of a primitive root of unity, thereby creating 2 times 2t integers;
    multiplying the 2 times 2t integers in a pairwise fashion to produce multiplication results;
    performing a modular reduction on the multiplication results of the 2t integer multiplications; and
    computing a linear combination of the 2t integers multiplied with primitive roots of unity to get 2t integers with limbs in a base $2^l$-bit representation, where l is an integer, that correspond to coefficients of the multiplication results, wherein the method allows an encryption or decryption operation using the two or more polynomials with integer coefficients to be performed on the processor for post-quantum cryptography.

2. The method of claim 1, wherein t and the multiple powers of the primitive root of unity are precomputed.

3. The method of claim 1, wherein the fixed power of two is determined to be at least large enough so that the fixed power of two is larger than every coefficient of the product of the first and second polynomials.

4. The method of claim 1, wherein the method is performed in a ring of a form $R_q=(\mathbb{Z}/q\mathbb{Z})[X]/(X^n+1)$ where coefficients of the polynomial are in $\mathbb{Z}/q\mathbb{Z}$ and the method is performed in modulo $X^n+1$.

5. The method of claim 1, wherein receiving the first and second polynomials further comprises storing the first and second polynomials in a processor of a data processing system.

6. The method of claim 1, wherein the cryptographic operation is a lattice-based cryptographic operation.

7. A method for multiplying two or more polynomials to perform a cryptographic operation in a data processing system, the method for use in a processor of the data processing system, the method comprising:
    receiving a first polynomial and a second polynomial in the processor;
    evaluating the first polynomial and the second polynomial at 2t inputs in the processor, where t is greater than or equal to one, and where each of the 2t inputs is a fixed power of two multiplied with a different one of multiple powers of a primitive root of unity $\zeta$, where $\zeta^{2^l}=-1$ mod($2^{2l_2 n}-1$), where l∈$\mathbb{Z}$ and where $\mathbb{Z}$ is a ring of integers, and where l is an integer, thereby creating 2 times 2t integers;
    multiplying the 2 times 2t integers in a pairwise fashion to produce multiplication results in the processor;
    performing a modular reduction on the multiplication results of the 2t integer multiplications; and
    computing a linear combination of the 2t integers multiplied with primitive roots of unity to get 2t integers with limbs in a base $2^l$-bit representation that correspond to coefficients of the multiplication results, wherein the method allows an encryption or decryption operation using the two or more polynomials with integer coefficients to be performed on the processor for post-quantum cryptography.

8. The method of claim 7, wherein t and the roots of unity are precomputed.

9. The method of claim 7, wherein the fixed power of two is determined to be at least large enough so that the fixed power of two is larger than every coefficient of the product of the first and second polynomials.

10. The method of claim 7, wherein the method is performed in a ring of a form $R_q=(\mathbb{Z}/q\mathbb{Z})[X]/(X^n+1)$ where coefficients of the polynomial are in $\mathbb{Z}/q\mathbb{Z}$ and the method is performed in modulo $X^n+1$.

11. The method of claim 7, wherein receiving the first and second polynomials further comprises storing the first and second polynomials in a processor of a data processing system.

12. The method of claim 7, wherein the cryptographic operation is a lattice-based cryptographic operation.

13. A data processing system comprising instructions embodied in a non-transitory computer readable medium, the instructions for multiplying two or more polynomials in a cryptographic operation in a processor, the instructions comprising:
- instructions for receiving a first polynomial and a second polynomial;
- instructions for evaluating the first polynomial and the second polynomial at 2t inputs, where t is greater than or equal to one, and where each of the 2t inputs is a fixed power of two multiplied with a different one of multiples powers of a primitive root of unity, thereby creating 2 times 2t integers;
- instructions for multiplying the 2 times 2t integers in a pairwise fashion to produce multiplication results;
- instructions for performing a modular reduction on the multiplication results of the 2t integer multiplications; and
- instructions for computing a linear combination of the 2t integers multiplied with primitive roots of unity to get 2t integers with limbs in a base $2^l$-bit representation that correspond to coefficients of the multiplication results.

14. The data processing system of claim 13, wherein t and the multiple powers of the primitive root of unity are precomputed.

15. The method of claim 13, wherein the fixed power of two is determined to be at least large enough so that the fixed power of two is larger than every coefficient of the product of the first and second polynomials.

16. The method of claim 13, wherein the method is performed in a ring of a form $R_q = (\mathbb{Z}/q\mathbb{Z})[X]/(X^n+1)$ where coefficients of the polynomial are in $\mathbb{Z}/q\mathbb{Z}$ and the method is performed in modulo $X^n+1$.

17. The data processing system of claim 13, wherein receiving the first and second polynomials further comprises storing the first and second polynomials in a processor of a data processing system.

18. The data processing system of claim 13, wherein the cryptographic operation is a lattice-based cryptographic operation.

* * * * *